March 11, 1930.  C. A. MARTIN  1,750,481
CONTROL SYSTEM
Filed Dec. 4, 1928
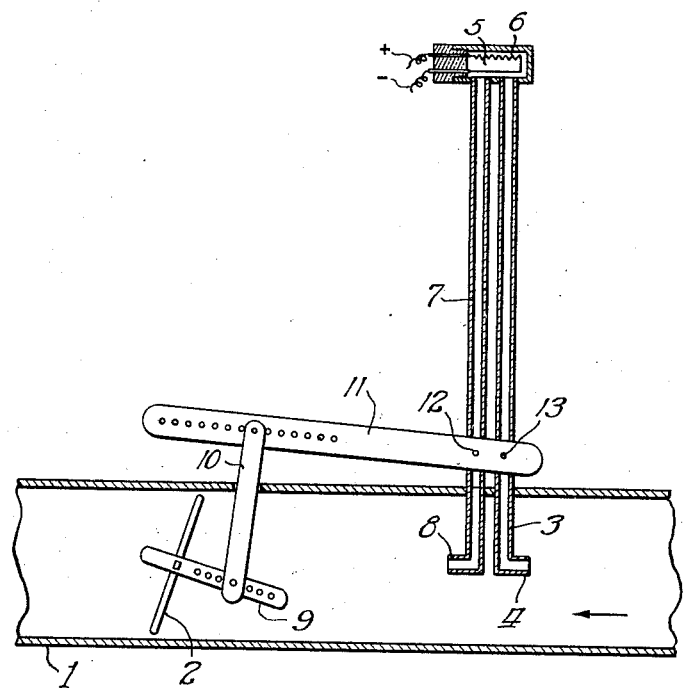
Inventor
Charles A. Martin Patented Mar. 11, 1930

1,750,481

UNITED STATES PATENT OFFICE

CHARLES A. MARTIN, OF CHICAGO, ILLINOIS

CONTROL SYSTEM

Original application filed August 6, 1925, Serial No. 48,592. Divided and this application filed December 4, 1928. Serial No. 323,739.

My invention relates to control systems and more particularly to systems of this character for suitably controlling the flow of fluid. This application is a division of my copending application Serial No. 48,592, filed August 6, 1925.

My invention contemplates means for automatically controlling the flow of fluid through a conduit by means of certain changes in the thermo characteristics of a portion only of said fluid.

My invention further contemplates the provision of means for by-passing a portion of the fluid in the conduit and thereafter applying heat to the by-passed fluid to change the thermo characteristics thereof to a degree proportional to the rate of flow of said fluid through the by-pass.

The operation and advantages of this invention will be brought out more clearly in the following description by reference to the accompanying drawings wherein, the figure shows one form which my invention may take.

In the figure I show a large conduit 1 which may be suitably used to conduct a fluid such as air or a fluid oil and which conduit has therein the swinging valve 2 adapted to permit a greater or lesser amount of fluid to flow through the conduit as the valve is opened or closed. At 3 I show the pipe extending down into the conduit 1 and having its end 4 projecting in the direction to receive the fluid as it flows along the conduit in the direction of the arrow.

The fluid flowing upwardly through the pipe 3 passes around the heating element 5 placed in the chamber 6 at the top of the pipe 3 and from there passes downwardly through the pipe 7 to again enter the conduit 1 and mingle with the fluid therein at the point 8. Thus it will be seen that the flow of fluid through the pipes 3 and 7 will be proportional to the flow of fluid in the main conduit 1, and an increase in the rate of flow in the conduit 1 will cause a corresponding increase in the rate of flow through the pipes 7 and 3.

The heating element 5 may be connected to any suitable source of electric current so that a constant heating effect may be applied by means of the element 5. Pipes 3 and 7 are preferably made of the same material and of the same length so that the co-efficient of expansion thereof will be the same as also will be the total expansion over any length thereof.

As the upper ends of these two pipes are fixed relative to each other, there will be a tendency when the fluid is heated by passing the heater 5 to cause a greater expansion of the pipe 7 than of the pipe 3 and the amount of this expansion may be suitably controlled as will be hereinafter explained to govern the flow of fluid.

Valve 2 is connected by means of the arm 9, link 10, and arm 11 to the pipes 3 and 7, the arm 11 being secured as at 12 and 13 at a fixed distance from the upper ends of the pipes 3 and 7. Suitable apertures are provided in the arms 9 and 11 to permit various adjustments of the link 10 and thereby vary the opening of the valve 2.

Assuming that the valve 2 has been adjusted to the proper opening to give a certain rate of flow of the fluid at a definite pressure when the by-passed fluid is receiving a certain definite heat from the input heater 5, this flow will remain constant so long as the rate of the flow in the main conduit is not caused to vary by means of an increase in the pressure or clogging of the valve 2 by foreign matter. However, if for any reason the rate of flow of fluid within the conduit 1 changes, there will be a corresponding change in the rate of flow in the by-pass made up of the pipes 3 and 7.

If this is an increase in the rate of flow, the fluid will pass by the heating means 5 more rapidly thereby receiving a less amount of heat per unit volume from the heater and causing a corresponding cooling of the pipe 7. This pipe, therefore, will contract slightly in length moving the free end of the arm 11 upwardly to in turn close the valve through the link 10 and arm 9 to again reduce the rate of flow of the fluid to its proper rate.

If for instance the rate of flow of the fluid through the conduit 1 is decreased, there would be a corresponding decrease in the rate of flow through the by-pass and a corresponding increase in the difference of temperature between the by-passed fluid in the pipe 3 and in pipe 7; which will operate by means of the difference in expansion of the pipes 3 and 7 to increase the opening of the valve 2 and thereby the rate of flow of fluid through the conduit 1.

It is therefore clear that the opening of the valve 2 is dependent upon the rate of flow of fluid within the by-pass through the pipes 3 and 7 which is in turn proportional to the rate of flow in the main conduit.

The opening of the valve 2 is also proportional to the amount of heat applied by the heater 5 and can thus be controlled by varying the heat input at the heater 5.

From the above description it is thought that the construction and operation of this device will be clear to those skilled in this art; and, having thus described my invention, what I claim as new and desire to secure by Letters Patent is:

1. A device of the character described comprising a valve for controlling the flow of fluid thru a passage, means for heating a portion only of said fluid during its travel, and means controlled by the thermal condition of said heated fluid for controlling said valve.

2. A device of the character described comprising a valve for controlling the flow of fluid thru a passage, means for by-passing and heating a portion of said fluid during its travel, and means controlled by the thermal condition of said heated fluid for controlling said valve.

3. Apparatus for automatically controlling the rate of flow of a fluid thru a conduit, comprising means for by-passing a portion of the fluid in said conduit, means independent of the rate of flow of said fluid for applying heat to the by-passed fluid, a valve in said conduit controlling the flow of fluid therethrough and expansible and contractible means responsive to the thermal conditions of the by-passed fluid for operating said valve towards open position for a decrease in the rate of flow of said fluid and towards the closed position for an increase in the rate of flow of said fluid.

4. A device of the character described, comprising a conduit thru which fluid is to be passed, a valve for controlling the flow of fluid thru said conduit, means for by-passing a portion of the fluid in said conduit, means in contact with the fluid in said by-pass means for changing the thermal characteristics thereof, and means responsive to the thermal characteristics of the by-passed fluid for controlling said valve.

5. A device of the character described, comprising a conduit thru which fluid is to be passed, a valve for controlling the flow of fluid thru said conduit, means for by-passing a portion of the fluid in said conduit, heating means in contact with the fluid in said by-pass means for changing the thermal characteristics thereof, and means responsive to the thermal characteristics of the by-passed fluid for controlling said valve.

6. Apparatus for automatically controlling the rate of flow of fluid thru a conduit comprising means for by-passing a portion of said fluid, means associated with said by-pass means for heating the by-passed fluid, and a valve in said conduit controlling the rate of flow of fluid therethru, and means responsive to the joint effect of the rate of flow of fluid in said by-pass means and the quantity of heat applied to said by-passed fluid for operating said valve.

7. Apparatus for automatically controlling the rate of flow of fluid thru a conduit comprising means for by-passing a portion of said fluid. electric heating means associated with said by-pass means for heating the by-passed fluid, and a valve in said conduit controlling the rate of flow of fluid therethru, and means responsive to the joint effect of the rate of flow of fluid in said by-pass means and the quantity of heat applied to said by-passed fluid for operating said valve.

8. Apparatus for automatically controlling the rate of flow of fluid thru a conduit comprising means for by-passing a portion of said fluid, means associated with said by-pass means for heating the by-passed fluid, and a valve in said conduit controlling the rate of flow of fluid therethru, means responsive to the joint effect of the rate of flow of fluid in said by-pass means and the quantity of heat applied to said by-passed fluid for operating said valve, and means for adjusting said valve to vary the quantity of flow for any given heat input.

9. Apparatus for automatically controlling the rate of flow of fluid thru a conduit, comprising means for by-passing a portion of the fluid in said conduit, said means including a pair of expansible and contractible elements, heating means associated with said by-pass means for varying the thermal conditions of the by-passed fluid and the expansion of one of said elements, and means responsive to the difference in expansion of said elements for controlling said valve.

In witness whereof, I hereunto subscribe my name this 28th day of November, A. D., 1928.

CHARLES A. MARTIN.